(12) United States Patent
Piasecki et al.

(10) Patent No.: US 7,438,259 B1
(45) Date of Patent: Oct. 21, 2008

(54) COMPOUND AIRCRAFT CONTROL SYSTEM AND METHOD

(75) Inventors: Frank N. Piasecki, Haverford, PA (US); Andrew S. Greenjack, Thornton, PA (US); Joseph F. Horn, State College, PA (US)

(73) Assignee: Piasecki Aircraft Corporation, Essington, PA (US)

( * ) Notice: Subject to any disclaimer, the term of this patent is extended or adjusted under 35 U.S.C. 154(b) by 0 days.

(21) Appl. No.: 11/505,235

(22) Filed: Aug. 16, 2006

(51) Int. Cl.
*B64C 27/22* (2006.01)
*G05D 1/00* (2006.01)

(52) U.S. Cl. .................. 244/6; 244/17.13; 244/175

(58) Field of Classification Search ............ 244/76 R, 244/174, 194, 17.11, 17.13, 17.19, 6, 175; 701/3, 4
See application file for complete search history.

(56) References Cited

U.S. PATENT DOCUMENTS

| | | | | |
|---|---|---|---|---|
| 3,241,791 A | * | 3/1966 | Piasecki ............ | 244/17.19 |
| 3,743,214 A | * | 7/1973 | Maciolek ............ | 244/2 |
| 3,746,279 A | * | 7/1973 | Maciolek et al. ....... | 244/2 |
| 4,807,129 A | * | 2/1989 | Perks ............... | 701/3 |
| 5,131,603 A | * | 7/1992 | Meyers ............. | 244/17.19 |
| 5,174,523 A | * | 12/1992 | Balmford ........... | 244/17.11 |
| 5,428,543 A | * | 6/1995 | Gold et al. .......... | 701/5 |
| 5,738,301 A | * | 4/1998 | Francois et al. ...... | 244/17.19 |
| 6,070,829 A | * | 6/2000 | Bellera et al. ........ | 244/17.13 |
| 6,259,975 B1 | * | 7/2001 | Rollet et al. ......... | 701/3 |
| 6,431,494 B1 | * | 8/2002 | Kinkead et al. ...... | 244/76 B |
| 6,474,603 B1 | * | 11/2002 | Kinkead et al. ...... | 244/195 |
| 6,478,262 B1 | * | 11/2002 | Kinkead et al. ...... | 244/195 |
| 6,592,071 B2 | * | 7/2003 | Kinkead et al. ...... | 244/7 R |
| 6,669,137 B1 | * | 12/2003 | Chen ................ | 244/7 R |
| 6,691,950 B2 | * | 2/2004 | Salesse-Lavergne .... | 244/17.13 |
| 6,742,742 B2 | * | 6/2004 | Claudet ............. | 244/17.13 |
| 6,793,173 B2 | * | 9/2004 | Salesse-Lavergne .... | 244/17.13 |
| 6,814,330 B2 | * | 11/2004 | Jones et al. ......... | 244/76 R |
| 7,255,306 B2 | * | 8/2007 | Jones et al. ......... | 244/76 R |
| 2006/0054737 A1 | * | 3/2006 | Richardson ......... | 244/17.11 |

* cited by examiner

*Primary Examiner*—Michael R. Mansen
*Assistant Examiner*—Joseph W Sanderson
(74) *Attorney, Agent, or Firm*—Lipton, Weinberger & Husick

(57) ABSTRACT

The Invention is a control system for a compound aircraft. A compound aircraft has features of both a helicopter and a fixed wing aircraft and provides redundant control options. The control system allows an authorized person to select any of plurality of control biases each which is designed to achieve an overall operational objective. The control system applies the selected control bias in allocating the control function among the redundant control options.

12 Claims, 11 Drawing Sheets

COMPOUND AIRCRAFT CONTROL SYSTEM AND METHOD

BACKGROUND OF THE INVENTION

1. Field of the Invention

The Invention is a control system for a compound aircraft. For trimmed flight, the control system selects a combination of trim control settings for the redundant controls of the compound aircraft to achieve a pilot's command consistent with a user-selectable objective, such as speed maximization, fuel consumption minimization, vibration reduction or lifecycle cost reduction. For maneuvering flight, the control system distributes control among the redundant control options of the compound aircraft and may perform that distribution consistent with the user-selectable objective. The Invention is also a method for controlling a compound aircraft.

2. Description of the Related Art

A 'compound' aircraft is an aircraft that includes features of both fixed wing aircraft and rotary wing aircraft. The compound aircraft includes the elements of a helicopter, including at least one main rotor and a mechanism to overcome the torque response of the rotating main rotor. The compound aircraft also includes elements of a fixed-wing aircraft, such as a wing. The wing may be equipped with ailerons, flaps or a combination of flaps and ailerons known as 'flaperons.' The compound aircraft may be equipped with a separate thrust mechanism to drive the aircraft forward, such as a propeller in a ducted fan. Through the use of appropriate vanes or sectors that change the configuration of the duct, the ducted fan may serve as the mechanism to overcome the torque response of the rotating rotor blades and to provide yaw control.

A compound aircraft offers several advantages over a conventional helicopter. Those advantages include achieving higher flight speeds and delayed onset of retreating blade stall and leading blade compression effects. Although the advantages of a compound helicopter are well known, no compound helicopters have been placed in regular operation in commercial or military fleets. One reason is the control complexity of the compound aircraft.

The pilot of a conventional helicopter has only limited controls. The controls available for a conventional helicopter having a single main rotor and a tail rotor are:

Throttle—The pilot can control the amount of power supplied to the rotor blades and to the tail rotor.

Collective pitch—The pilot contemporaneously can change the pitch of all main rotor blades by an equal amount using the collective pitch control, also known as the 'collective.' Contemporaneously changing the pitch angle of all main rotor blades increases or decreases the lift supporting the helicopter. Increasing the collective and the power will cause the helicopter to rise. Decreasing the collective and the power will call the helicopter to sink.

Cyclic pitch—The pilot may use the cyclic pitch control, also known as the 'cyclic,' to cause the pitch angle of the main rotor blades to change differentially as the main rotor rotates through 360 degrees. The cyclic pitch control is used to control the pitch and roll of the helicopter. For example, increasing the pitch angle of a rotor blade when the rotor blade is retreating toward the rear of the helicopter and decreasing the pitch angle when the rotor blade is advancing toward the front of the helicopter will cause the main rotor plane of rotation to tilt forward and hence will cause the helicopter to move forward.

Tail rotor pitch control—For a conventional helicopter having a tail rotor mounted on a boom, a pedal-operated yaw control changes the pitch of the tail rotor blades so that the tail rotor presents more or less force countering the torque response of the rotating main rotor. The pitch of the tail rotor blades therefore controls the yaw of the conventional helicopter.

For a conventional helicopter and for a particular throttle setting, there is only one combination of trim control settings for the collective, cyclic and tail rotor pitch controls to achieve any particular desired trimmed condition of the helicopter. The pilot of the conventional helicopter therefore has few control options.

A compound aircraft will have the aforementioned controls and in addition will have other controls. For example, the compound aircraft may feature the following controls:

Flaperon controls—The flaperons (a combination of flaps and ailerons) are located on the wings. When deflected differentially like ailerons, the flaperons may cause the aircraft to roll. When deflected in unison like flaps, the flaperons may increase or decrease lift generated by the wing. In hovering flight, the flaperons may be deployed to reduce the effective wing area and hence reduce the downward force on the wings from the downwash of the main rotor.

Forward thrust control—The compound aircraft may be equipped with a ducted fan or other mechanism to provide forward thrust. Thrust provided by the ducted fan or by another mechanism that is not the main rotor is referred to in this application as "non-rotor forward thrust."

Rudder/stabililator—The compound aircraft may be equipped with a rudder and with an elevator or stabilator. The rudder controls the yaw of the aircraft, in cooperation with the tail rotor, ducted fan, or other mechanism countering the torque reaction of the rotating main rotor. An elevator or stabilator controls the pitch of the compound aircraft, in cooperation with or instead of the cyclic pitch control.

The pilot of the compound aircraft is presented with a variety of control combinations to achieve a desired flight condition. For example, if the pilot desires to increase the forward speed of the compound aircraft, the pilot can increase the non-rotor forward thrust using the forward thrust control, can use the cyclic pitch, stabilator and throttle controls to pitch the aircraft forward, or can use any combination of forward thrust control, stabilator, cyclic pitch control and throttle. Each of the possible combinations of trim control settings offers advantages and disadvantages. A combination of trim control settings that is optimal for one objective (for example, minimizing fuel consumption) may not be optimal for another objective (for example, minimizing vibration).

Only one combination of trim control settings for the compound aircraft will be optimal for achieving a particular trimmed condition or for implementing maneuvering flight commands consonant with also achieving a particular operational objective. The prior art does not disclose a control system for a compound aircraft that allows selection among a plurality of objectives and that then automatically optimizes control settings to achieve pilot control commands consistent with the selected objective.

BRIEF DESCRIPTION OF THE INVENTION

The Invention is a control system for a compound aircraft. A user selects an overall objective for the control system, such as reducing vibration, increasing performance and speed, reducing lifecycle costs, reducing loading of one or more components, reducing fuel consumption, or any combination of these objectives or of any other desired objectives. The overall objective is pre-selected from among a plurality of overall objectives by the pilot or by another authorized person; for example, by the owner of the compound aircraft. The control system receives a command from a pilot for trimmed flight. The control system also receives information from sensors relating to current aircraft condition (such as attitude, altitude, vertical speed, airspeed, main rotor speed, control surface positions, acceleration and angular rates).

The control system compares the pilot command to the current aircraft condition as detected by the sensors and consults a look-up database of combinations of trim control settings. The control system applies the user-selectable overall objective in consulting the look-up database. The control system selects one of the combinations of trim control settings for trimmed flight from the look-up database. The selected combination of trim control settings provides a control setting for each of the various control effectors of the compound aircraft to achieve the pilot's intended trimmed flight condition consistent with the pre-selected overall objective. As used in herein, the term 'control effector' means collectively all of the various flight control surfaces and engines of the compound aircraft. The control system applies the selected combination of trim control settings to the control effectors of the compound aircraft, including the redundant control effectors.

The sensors monitor the current condition of the aircraft and provide constant feedback to the control system. The control system continuously selects and applies different combinations of trim control settings from the look-up database as needed to achieve the selected overall objective for trimmed flight. If the pilot control inceptors are in 'detent,' which is a neutral position that does not indicate a commanded change in aircraft condition, a feedback controller regulates the aircraft control effectors so that the aircraft stays in trim and the selected overall objective is achieved.

In the event the pilot maneuvers the aircraft, the control system will receive a pilot command from a control inceptor operated by the pilot and will filter the pilot command using a 'command filter' to determine the commanded change in aircraft condition. The command filter determines the dynamic response and thus the handling qualities of the compound aircraft. The control system compares the filtered pilot command to the condition of the aircraft as detected by the sensors and selects a combination of control effector settings to achieve the maneuver.

The control system applies 'weighting factors' to control the distribution of control among the redundant control effectors in maneuvering flight. The control designer can select a combination of weighting factors to achieve an overall objective for maneuvering flight, such as minimization of certain structural loads. An authorized person, such as the pilot or owner of the aircraft, may select an overall objective for maneuvering flight from among a plurality of objectives. The selected overall objective for maneuvering flight may be the same as or different from the selected overall objective for trimmed flight. The control system may consult a look-up database and select a combination of weighting factors associated with the selected overall objective for maneuvering flight. The control system applies the selected combination of weighting factors in allocating control among the redundant control surfaces. The control system will supply the selected control settings to the appropriate actuators to achieve the maneuver. When the control inceptors are returned to detent, the aircraft will once again reach trim, with the appropriate control settings to achieve the selected overall objective for trimmed flight.

The pilot may change the overall objective for trimmed or maneuvering flight and hence the applied control trim settings or weighting factors during flight. For example, the pilot may change the overall objective for trimmed flight from 'reduce vibration' to 'maximize speed.' The control system then will select a different combination of trim control settings to accomplish the new overall objective for trimmed flight. Alternatively, the pilot may not be authorized to change the overall objective for trimmed or maneuvering flight and the function of selecting the overall objective may be reserved to another person, such as the owner of the aircraft.

In an important application of the Invention, a pilot will fly a compound aircraft using only the familiar helicopter flight controls of collective pitch, cyclic pitch and tail rotor pitch (pedal yaw control), just as if the pilot were flying a conventional helicopter. The control system receives the collective, cyclic and tail rotor inputs from the pilot and infers the intent of the pilot. The control system then selects an appropriate combination of trim control settings for the collective, cyclic, flaperon, forward thrust, elevator, sector, rudder and any other available control effector to best achieve the pilot's intent, consistent with the pre-selected overall objective for trimmed or maneuvering flight. A pilot skilled in flying a conventional helicopter may therefore pilot a compound aircraft using the control system of the Invention and achieve the selected overall objective without simultaneously applying the skills of a fixed-wing pilot.

The control system of the Invention may be a component of a fully authorized "fly-by-wire" system in which the control system operates all aircraft flight controls. Alternatively, the control system of the Invention may be configured to operate only a portion of the controls of the aircraft. For example, the pilot may directly control the collective, cyclic pitch and throttle controls, while the control system of the Invention automatically controls the flaperons and forward thruster.

DESCRIPTION OF AN EMBODIMENT

A. Compound Aircraft Features

Figure 1:
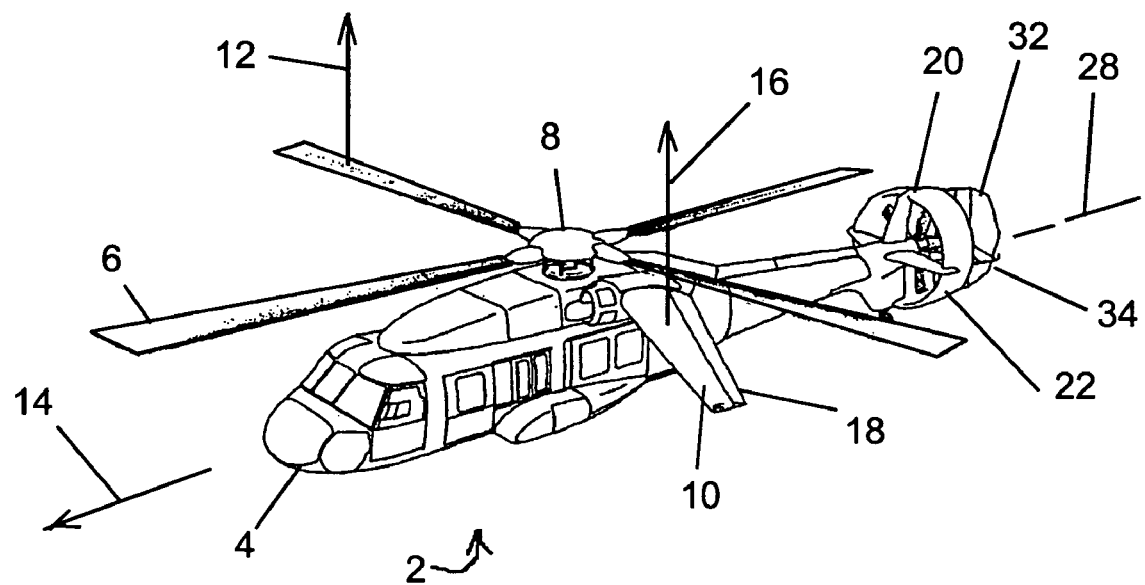
FIG. 1 is a perspective view of a compound aircraft.
Figure 2:
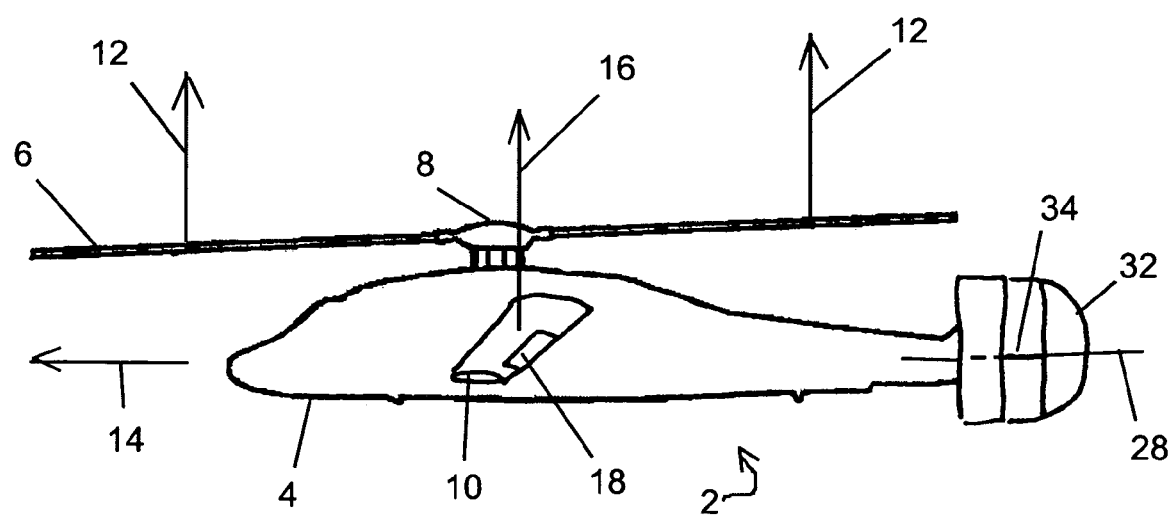
FIG. 2 is a side view of a compound aircraft.

The apparatus of the Invention is a control system for a compound aircraft 2. As shown by FIGS. 1 and 2, the compound aircraft 2 includes features of both a helicopter and a fixed wing aircraft. Those features include a fuselage 4, a main rotor (or rotating wing) 6, a hub 8 about which the main rotor 6 rotates and wings 10. Rotation of main rotor 6 about hub 8 induces main rotor lift 12. Movement of air across wings 10 in response to the forward motion 14 of the compound aircraft 2 generates wing lift 16. Rotor lift 12 and wing lift 16 provide lift to the compound aircraft 2.

Wings 10 feature a wing control surface known as a 'flaperon' 18. Flaperon 18 may be moved differentially, in which event flaperons 18 act as ailerons. When used as ailerons, the flaperons 18 in conjunction with wings 10 impart a rolling moment to fuselage 4. The flaperons 18 also may be moved in unison, in which event the flaperons 18 act as flaps. When used as flaps, flaperons 18 change the aerodynamic characteristics of the wing 10 and change wing lift 16.

Figure 3:
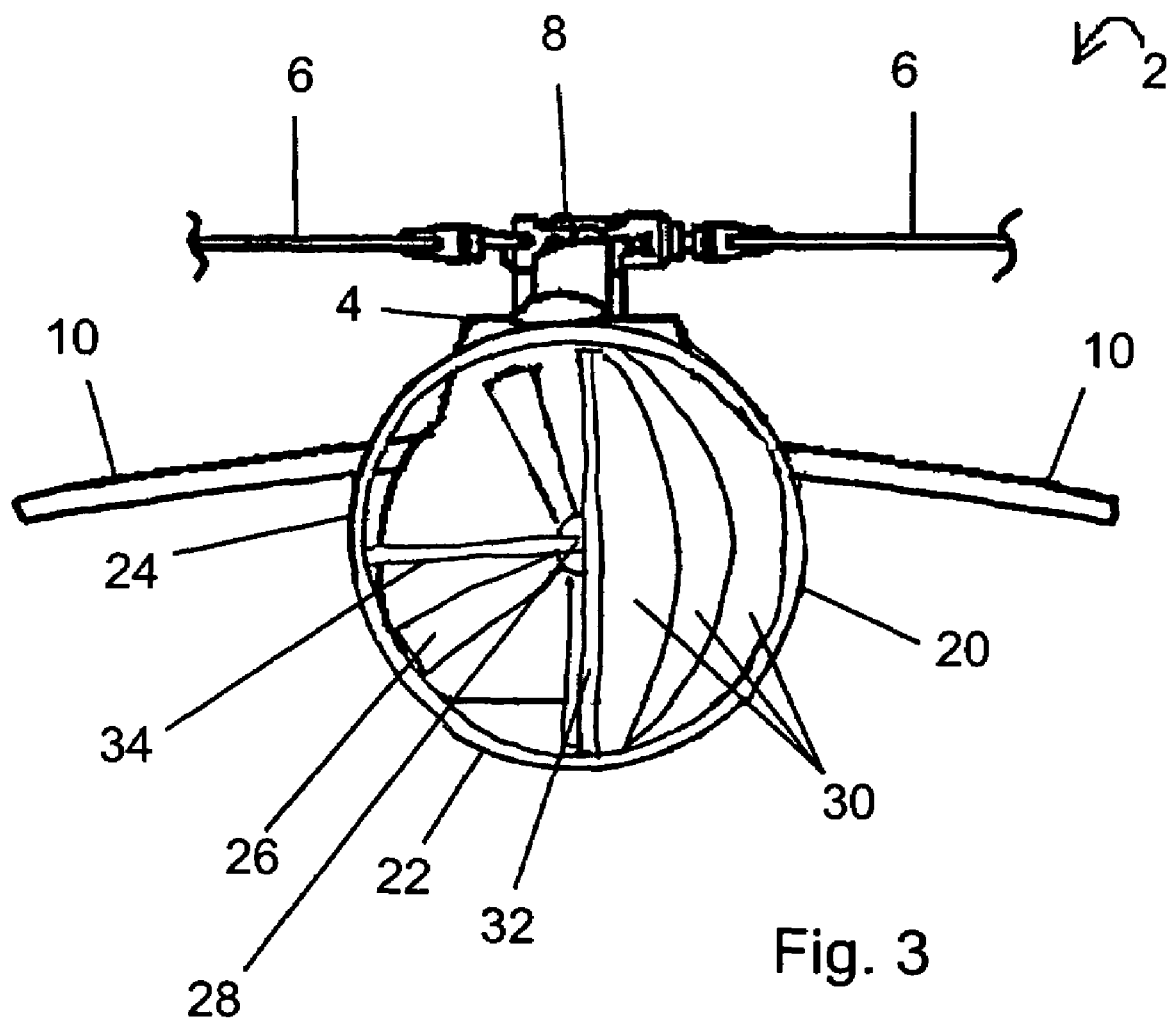
FIG. 3 is a rear view of a compound aircraft.

FIG. 3 is a rear view of the compound aircraft 2. As shown by FIGS. 1, 2 and 3, the tail of the compound aircraft 2 features a forward thruster 20. Forward thruster 20 is preferably a ducted fan 22. Ducted fan 22 features a shroud 24. Shroud 24 improves safety and reduces the likelihood of damage to the propeller 26 resulting from contact between the propeller 26 and the ground.

Propeller 26 rotates about a ducted fan axis of rotation 28, which is generally parallel to the forward direction 14 of compound aircraft 2. Propeller 26 is directly connected to the drive system for main rotor 6, and so the speed of rotation of propeller 26 is directly proportional to the speed of rotation of main rotor 6 and is not independently controllable. The pitch of propeller 26 is variable, allowing adjustment of the amount of thrust provided by ducted fan 22.

Sectors 30, shown by FIG. 3, form an adjustable segmented duct to selectably change the direction of thrust of ducted fan 22. Sectors 30, in conjunction with rudder 32, serve to selectably direct the thrust of ducted fan 22 to apply a torque to fuselage 4 contrary to the torque applied by main rotor 6. FIG. 3 shows the sectors 30 in a deployed position and ready to direct ducted fan 22 thrust to counter the torque of the main rotor 6.

Rudder 32 is adapted to cooperate with sectors 30 to control the direction of thrust of ducted fan 22. Rudder 32 is in the air stream of fan rotor 26 and therefore is capable of affecting yaw of the compound aircraft 2 at any speed.

Elevator 34 corresponds to the elevator of a fixed wing aircraft. Elevator 34 is in the air stream of fan rotor 26 and is capable of affecting the pitch of the compound aircraft 2 at any speed.

B. Control System Overview

Figure 4:
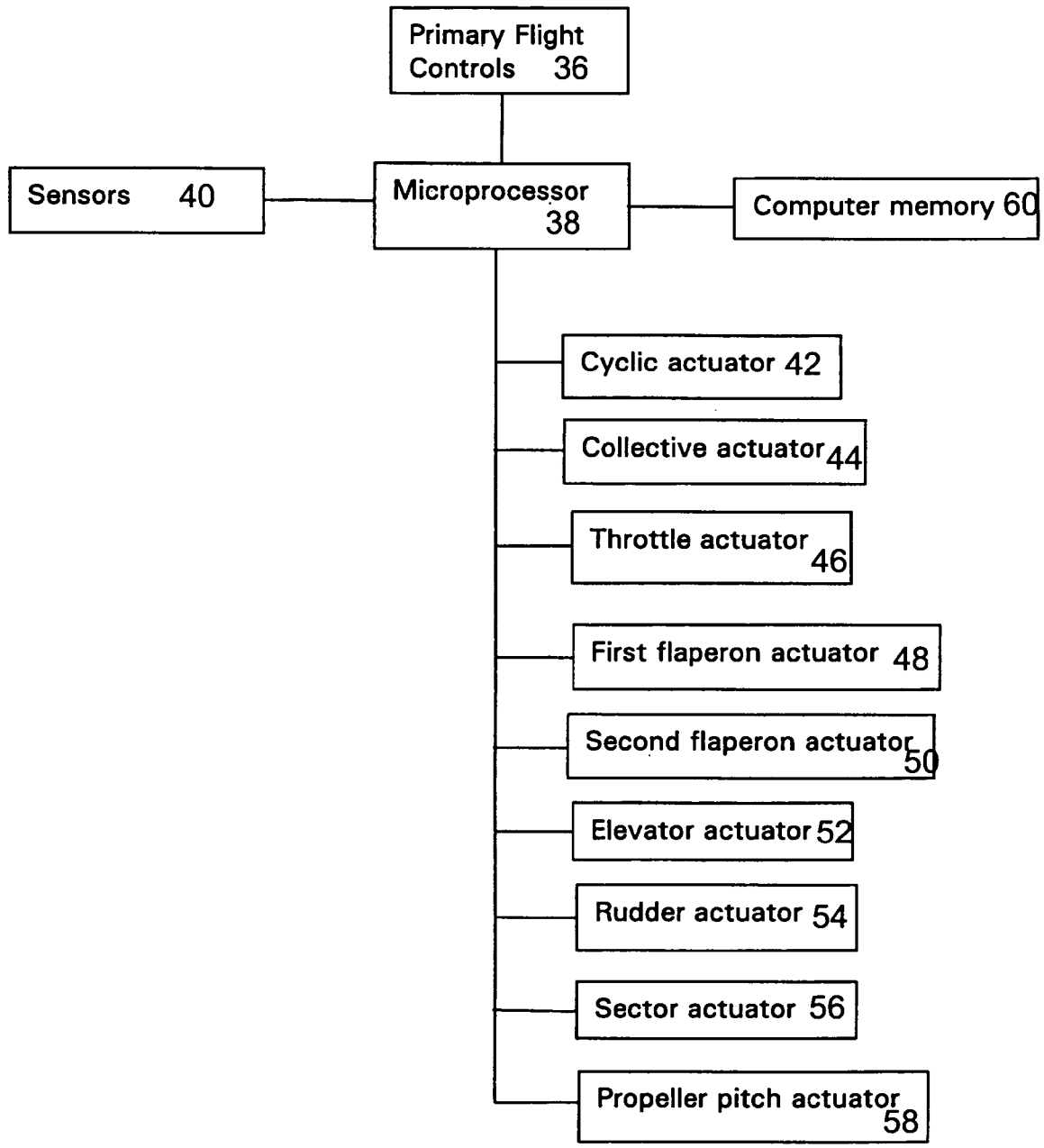
FIG. 4 is a schematic representation of the control system of the invention.

FIG. 4 describes the operational relationship between the physical components of the control system of the Invention. A pilot operates control inceptors 36. The control inceptors 36 correspond to the flight controls of a conventional helicopter, with a collective pitch control, a cyclic pitch control, pedal yaw control and throttle. A person skilled at flying a helicopter therefore may operate the compound aircraft 2 without simultaneously applying the skills of a fixed-wing pilot. The control inceptors 36 are connected to a microprocessor 38.

Sensors 40 monitor the condition of the compound aircraft 2 and are connected to the microprocessor 38. The sensors 40 may monitor compound aircraft 2 variables such as airspeed, weight and balance parameters, ambient atmospheric conditions, engine torque, propeller 26 torque, vertical speed, pitch rate and attitude, roll rate and attitude, and yaw rate.

Microprocessor 38 is operably connected to actuators for each of the control effectors of the compound aircraft 2. Those control actuators include the cyclic pitch actuator 42, the collective pitch actuator 44, the throttle actuator 46, the first and second flaperon actuators 48, 50, the elevator actuator 52, the rudder actuator 54, the sector actuator 56 and the propeller pitch actuator 58. Each of the actuators is adapted by conventional means to operate its associated control effector under the command of the microprocessor 38.

Computer memory 60 is connected to microprocessor 38. Computer memory 60 includes a plurality of selectable overall operational objectives for the compound aircraft 2. Memory 60 also contains a trim schedule comprising a lookup database of combinations of trim control settings selected to achieve each of the selectable overall operational objectives for any given condition of the aircraft and any given pilot command. The microprocessor 38 consults the database and selects the combination of trim control settings applicable to the condition of the aircraft, the pilot command, and the selected overall operational objective. The microprocessor constantly updates the selection of the combination of trim control settings based on feedback from the sensors detecting the changing aircraft conditions.

The microprocessor applies the selected combination of trim control settings for trimmed flight. "Trimmed flight" includes coordinated, level flight and also may include a steady climb or descent or a coordinated turn.

The control system 62 of the Invention uses a "unique trim" concept; that is, when the pilot places the control inceptors in a neutral, or detent, position, the control system 62 of the compound aircraft 2 automatically goes to a trimmed flight condition. The way in which the compound aircraft 2 is trimmed is selected by the control system 62 of the Invention based upon the selected overall operational objective and based upon the condition of the aircraft 2 as detected by the sensors.

The selected combination of trim control settings defines the control effector positions and trimmed attitude of the compound aircraft 2 required to achieve the optimal trim to accomplish an overall operational objective. Sensors 40 determine the deviation by the compound aircraft 2 from the selected combination of trim control settings. Feedback paths in the control system 62 can add or subtract to the effector positions or attitude commands. Since the compound aircraft 2 is closed-loop stable, over time if the pilot keeps the control inceptors in detent, the aircraft 2 will eventually settle into a trimmed condition very close to the optimal trim.

C. Control System Information Flow

Figure 5:
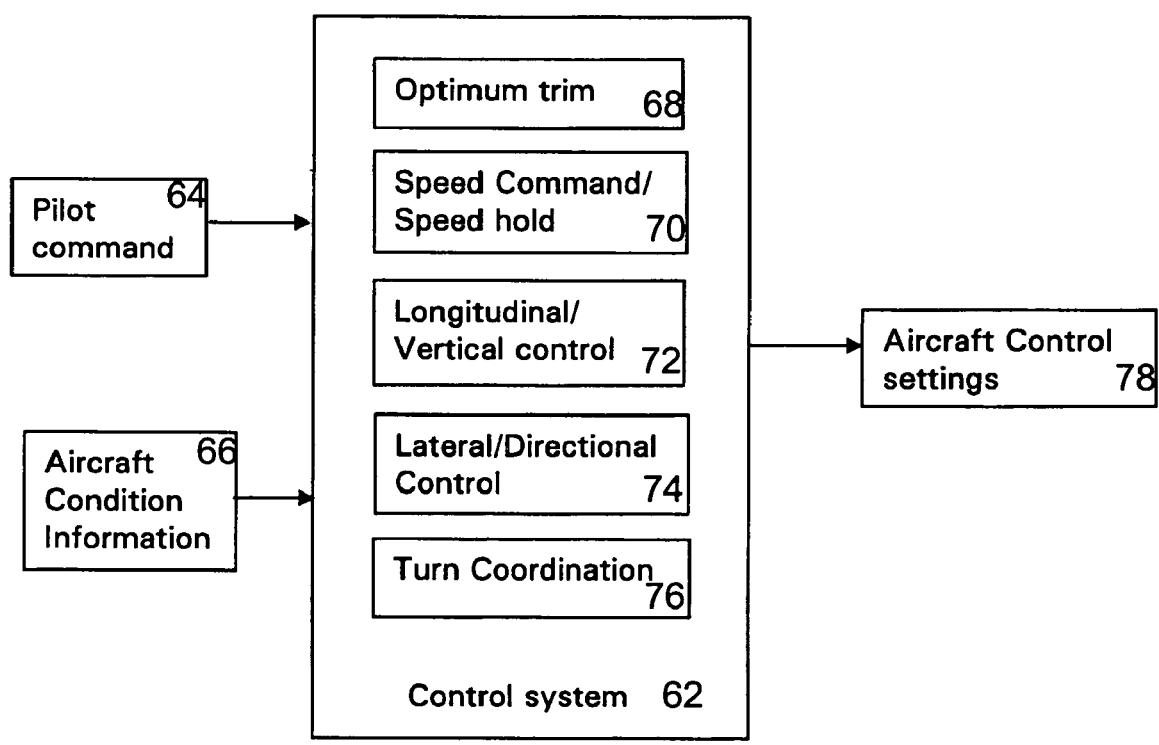
FIG. 5 is a schematic representation of information flow through the control system of the Invention.

FIG. 5 provides an overview of the flow of information through the control system 62 and the principal functions of the control system 62. The control system 62 receives a pilot command 64. The pilot command 64 is generated by the control inceptors 36 of FIG. 4 and represents an instruction by the pilot of the compound aircraft 2. The control system 62 also receives a variety of aircraft condition information 66. The aircraft condition information 66 is generated by sensors 40 as shown by FIG. 4 and provides the microprocessor 38 with the status of the compound aircraft 2.

The control system 62 examines the sensor information 66 to determine the condition of the compound aircraft 2 and to evaluate the pilot command 64 to determine how the condition of the aircraft will be affected by the pilot command 64. The control system 62 is fully authorized to operate all of the control effectors of the compound aircraft 2. The control system 62 includes subsystems for selecting optimal trim 68, speed command/speed holding 70, longitudinal/vertical control 72, lateral/directional control 74 and turn coordination 76. The control system 62 determines the appropriate subsystem to apply based on the pilot command 64 and aircraft condition information 66 received. The control system 62 then applies the protocols of the appropriate subsystem to determine the appropriate aircraft control settings 78 to accomplish the pilot command 64 and transmits those control settings 78 to the appropriate actuators illustrated by FIG. 4.

The control system 62 relies on feedback to implement the commands of the pilot and preferably will incorporate explicit model-following control architecture, as is known in the art. In such a system, a pilot commands that the compound aircraft 2 assume a selected flight condition. The control system 62 determines the condition of the aircraft 2 utilizing sensors 40. The control system 62 determines the changes to the condition of the aircraft required to reach the commanded condition. The control system 62 applies an inverse model to determine the specific control settings 78 required to achieve the commanded condition and applies those control settings 78 to the control effectors of the aircraft 2. To compensate for disturbances and modeling or inversion error, the control system 62 measures the changing state of the aircraft 2 using the sensors 40 and feeds back the information to update the control settings 78 and achieve the commanded condition of the aircraft 2.

For a conventional helicopter without the redundant controls of a compound aircraft, the prior art model following/model inversion process is straightforward. The model inversion determines the single combination of trim control settings 78 that will achieve the desired change in the state of the aircraft and dynamically updates that combination of trim control settings 78 to accommodate changing conditions and modeling errors.

For a compound aircraft 2 with redundant controls, the model inversion process is more complex. Because of the redundancy, many different combinations of trim control settings 78 can achieve a particular change in aircraft state. For any particular change in aircraft state, the forces to achieve that change in state can be allocated among the applicable control effectors and the control settings adjusted accordingly.

The control subsystems 68-76 illustrated by FIG. 5 require different aircraft condition information 66 and require adjustment of different combinations of control actuators 42-58, from FIG. 4.

D. Control System Architecture

Each of the control subsystems 68-76 is discussed below and is illustrated in more detail by FIGS. 6-11. The following terms have the following meanings in FIGS. 6-11 and in the discussion below.

$\beta_p$ is the propeller pitch in degrees.

$\delta_{coll}$ is the collective control to the mixer in inches.

$\delta_e$ is the elevator deflection in degrees.

$\delta_{FO}$ is the symmetric flaperon deflection in degrees.

$\delta_{Flat}$ is the differential elevator deflection in degrees.

$\delta_{lat}$ is the lateral control to the mixer.

$\delta_{long}$ is the longitudinal control to the mixer.

$\delta_{yaw}$ is the yaw control to the VTDP mixer.

$\phi$ is the roll attitude in radians.

$\theta$ is the pitch attitude in radians.

$\Omega$ is the rotor speed in radians/second.

$\tau_y$ is the yaw response time constant.

$a_y$ is lateral acceleration in ft/sec$^2$.

'c' subscript means 'post-command filter.'

'cmd' subscript means 'command.'

FADEC means "Fully Automatic Digital Electronic Control. The FADEC controls fuel to the engine to regulate rotor speed.

GW means gross weight.

$HP_e$ is the engine power in standard horsepower.

$HP_{VT}$ is the power utilized by the VTDP in standard horsepower.

$K_\theta$ is the ratio of forward thrust from the rotor to one plus forward thrust from the propellers.

$K_D$ is the derivative gain.

$K_I$ is the integral gain.

$K_P$ is the proportional gain.

$P_{amb}$ is the ambient pressure in pounds per square inch.

P is the roll rate in radians/second.

q is the pitch rate in radians/second.

r is the yaw rate in radians/second.

s is the Laplace operator.

$T_{amb}$ is the ambient temperature.

$\tau_h$ is the vertical response time constant.

'trim' subscript means 'optimal trim value.'

U is a pilot command that is filtered to avoid exceedence of operating parameters.

V is the forward speed in knots or feet/second.

VTDP means 'vectored thrust ducted propeller' and is the ducted fan.

$V_Z$ is the vertical speed feet/second. Downward is positive.

$\omega_{n\theta}$ is the pitch response natural frequency.

W is the vertical body velocity in feet/second.

$\chi_{Bp}$ is the relationship between propeller pitch and the amount of thrust generated by the propellers, and varies with airspeed.

$\chi_{CG}$ is the longitudinal center of gravity (CG) position.

Figure 6:
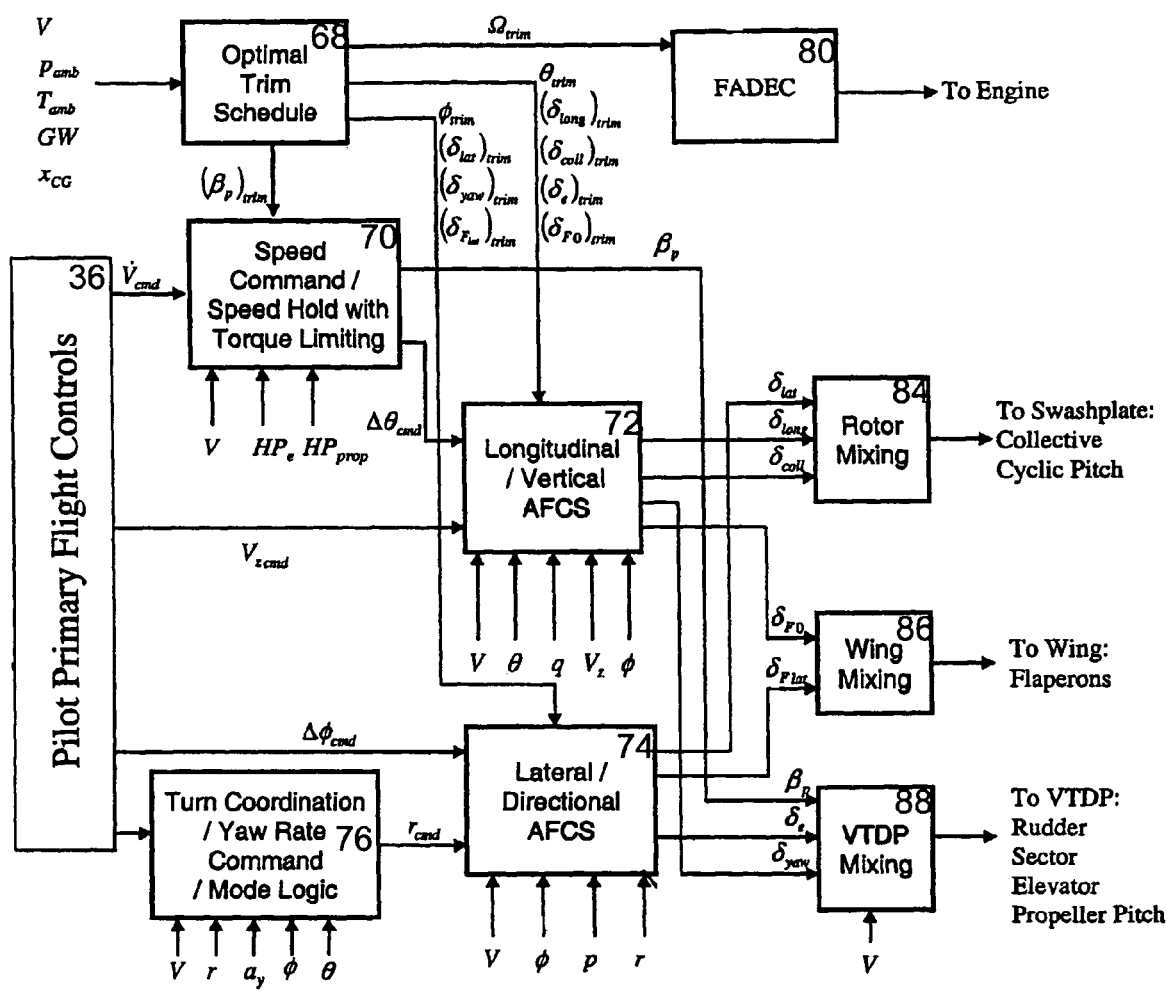
FIG. 6 illustrates the overall control system architecture.

FIG. 6 is a more detailed diagram of the overall control system 62 architecture. Optimum trim schedule 68 is a lookup database of combinations of trim control settings 78 and provides control settings and aircraft attitude for trimmed flight. Optimum trim schedule 68 schedules the combinations of trim control settings 78 based on control inceptor input, aircraft condition information 66 and the selected overall operational objective. The aircraft condition information 66 for the optimum trim schedule 68 may include airspeed, weight and balance parameters and ambient conditions. The output of the optimum trim schedule 68 comprises optimum trim control settings 78 for all control subsystems 70-76. As noted, the overall operational objective is selectable and may include minimizing fuel consumption, minimizing fatigue damage or any other objective or combination of objectives. As shown by FIG. 6, the optimal rotor speed ($\Omega_{TRIM}$) selected by the optimal trim schedule subsystem 68 is supplied directly to the FADEC and determines engine power output.

As shown by FIG. 6, the pilot manipulates the control inceptors 36 of cyclic pitch, collective pitch, pedal yaw control and throttle. The pilot command is processed and the relevant components, as indicate by FIG. 6, are directed to the subsystems of speed command/speed hold control 70, longitudinal/vertical control 72, lateral/directional control 74 and turn coordination/yaw rate command 76. Each of the subsystems 70-76 also receives the trim control settings selected by the optimal trim schedule subsystem 68 and relevant aircraft condition information 66 from the sensors 40. Each of the subsystems 70-76 synthesizes the information received and determines control settings to accomplish the control task assigned to the subsystem, described in more detail below.

E. Control Mixing

The resulting signals from the subsystems 68-76 must be mixed as shown by FIG. 6. Control mixing is a conventional technique used on rotary-wing and fixed-wing aircraft to minimize cross-coupling effects. Cross-coupling is a change in aircraft 2 attitude or velocity that results from the displacement of a pilot control inceptor which is not consistent with the primary objective of that inceptor. For example, on a helicopter the primary function of the collective lever is to increase or decreases thrust on the main rotor 6 and thereby change the vertical velocity of the vehicle. The control system achieves this effect by changing collective pitch of the main rotor 6 proportional to the collective lever. However, changes in collective pitch also change the torque of the rotor 6 and the resultant torque reaction causes the aircraft to yaw. Control mixing can be used to allow tail rotor collective pitch to also vary with the pilot's collective lever in order to reduce the collective-to-yaw cross-coupling. Control mixing can be achieved mechanically or in the software of a fly-by-wire control system.

As other examples of control mixing, both the longitudinal/vertical control 72 and the lateral/directional control 74 subsystems control the flaperons 18 to accomplish the different tasks of those subsystems 72, 74. The flaperon 18 control signals generated by both subsystems 72, 74 must be mixed in the wing mixing module 82 to generate a consistent control signal to the flaperon actuators 48, 50. Similarly, the collective and cyclic control signals from the speed command/speed hold subsystem 70, the longitudinal/vertical control subsystem 72 and the lateral/directional control subsystem 74 must be mixed in the rotor mixing module 84 prior to sending control settings 78 to the collective and cyclic actuators 42, 44.

For a compound aircraft equipped with a Vectored Thrust Ducted Propeller (VTDP) 22, the VTDP 22 provides selectable forward or reverse thrust and yaw control using a combination of rudders 32, sectors 30, and the propeller 26. The rudder 32 and sectors 30 are in the slipstream of the propeller 26, so the forces generated by these control surfaces are coupled to the propeller pitch. The VTDP control mixer 86 is used to determine the combination of rudder 32, sector 30, and propeller 26 pitch to achieve the desired thrust and yaw moment for the given flight condition and pilot control inputs. In hover and low speed flight, the VTDP 22 is typically configured so that the sectors 30 and rudder 32 are fully deflected and yaw control is achieved using variations in propeller 26 pitch (this is the "low speed mode"). In forward flight the sectors 30 are retracted, and yaw control is achieved primarily by deflecting the rudder 32 ("high speed mode"). The VTDP control mixer 86 must change the control surface to achieve the low speed mode, high speed mode, and transitions between the two modes. The inputs to the VTDP control mixer 86 consist of the yaw control input, a propeller 26 pitch setting (used for forward thrust control), and calibrated airspeed of the aircraft 2. The yaw control input and propeller 26 setting may come from the pilot control inceptors, the electronic flight control system, or some combination of the two. The output of the VTDP control mixer 86 includes the propeller 26 pitch, and the rudder 32 and sector 30 deflections. The VTDP control mixer 86 also may include constraints to ensure proper controllability and to ensure load limits are not exceeded. For example, decreasing propeller 26 pitch setting in high speed flight may be used to slow down the aircraft 2, but the reverse thrust is limited since it reduces flow over the rudder 32 and thereby decreases yaw controllability. There are also airspeed limits on when the low speed mode can be used since large deployment of sectors 30 at high speeds can result in large loads.

F. Longitudinal/Vertical Control

Figure 7:
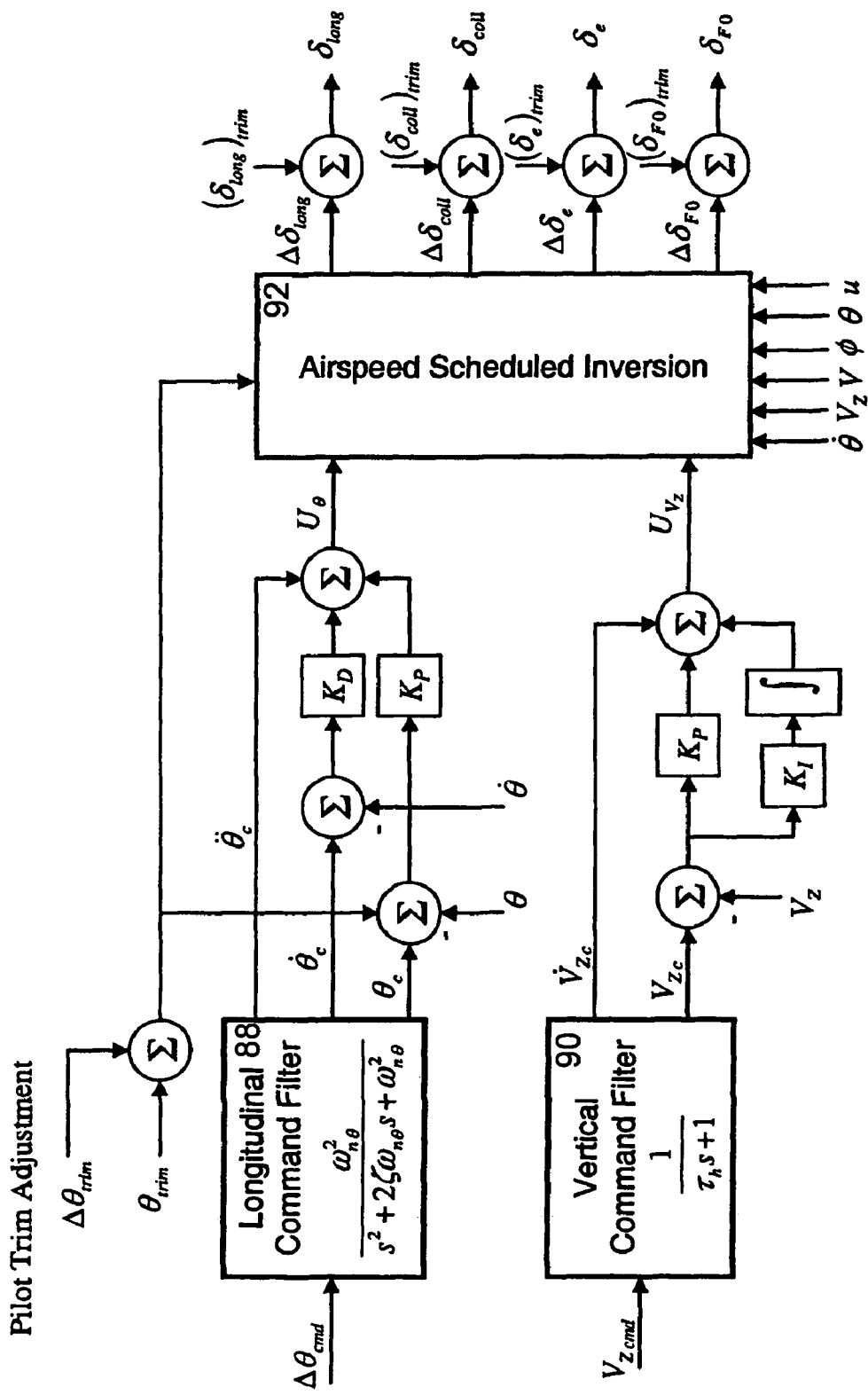
FIG. 7 illustrates the longitudinal/vertical control subsystem.

FIG. 7 illustrates the architecture of the longitudinal/vertical control subsystem 72. The coupled longitudinal and vertical control subsystem 72 controls the longitudinal pitch attitude ($\theta$) and vertical motion ($V_Z$) of the compound aircraft 2. The longitudinal/vertical control system 72 decreases the pilot workload by selecting control settings 78 to achieve and hold a longitudinal pitch attitude in response to a pilot command 64. The longitudinal/vertical control system 72 also will select control settings 78 to achieve a pilot command 64 for the aircraft to move vertically and a pilot command 64 to hold a commanded altitude.

The inputs to this subsystem are the commanded pitch attitude, the commanded vertical speed, and the trim pitch attitude. The aircraft condition information 66 used by the longitudinal/vertical control 72 may include the aircraft pitch rate and attitude, vertical speed and airspeed. The aircraft control settings 78 generated by the control system 62 include longitudinal cyclic, collective, elevator deflection and symmetric flaperon deflection.

In operation and as shown by FIG. 7, the longitudinal/vertical control 72 receives a command for a change in aircraft pitch ($\Delta\theta_{CMD}$) and a change in vertical speed ($\Delta V_{ZCMD}$). The longitudinal command filter 88 will consider the existing pitch rate and pitch attitude and determines the desired dynamic response of the aircraft in the pitch and vertical axes. The longitudinal command filter 88 allows the aircraft to meet the ADS-33 Handling Qualities Specifications, if applicable. The pitch response is represented by a second order filter. The command filter calculates the desired pitch attitude, attitude rate, and attitude acceleration. The desired attitude and attitude rate are compared to measured values and multiplied by gains and summed with the desired pitch acceleration. The summed value is the pitch pseudo-control, which represents the commanded pitch attitude acceleration. The modified command is indicated as $U_\theta$ on FIG. 7.

As shown by FIG. 7, the pilot command 64 for a change in vertical speed is treated similarly. The vertical response is represented by a first-order filter. The time constant can be selected to meet ADS-33 heave response specifications. The outputs of the filter are the desired vertical speed and vertical acceleration. The desired vertical speed is compared to the measured value and passed through a proportional plus integral compensator. This is summed with the desired vertical acceleration to calculate the vertical axis pseudo-control, which represents the commanded vertical acceleration of the aircraft.

From FIG. 7, the pitch and vertical axis pseudo-controls are passed though a model inversion. The inversion module 92 determines what changes to the control settings ($\delta$) must be made to achieve the filtered command (U). The inversion module 92 considers the trim settings from the optimum trim schedule 68 and the condition of the aircraft from the sensors 40. The inversion module 92 is 'airspeed scheduled' because the results of the model vary with air speed. The inversion module 92 allocates the pitch commands between the redundant controls that affect the pitch of the compound aircraft 2; namely, the longitudinal cyclic control and the elevator 34 deflection control. For example, the inversion module 92 may allocate more of the pitch control duties to the elevator 34 and less to the longitudinal cyclic to reduce the loads on the rotor hub 8.

To implement the model inversion of the longitudinal/vertical control 72, the pitch pseudo-control (which represents the second derivative of the pitch Euler angle) and the vertical pseudo-control (which represents the vertical acceleration in the inertial frame) are converted to pitch acceleration and vertical acceleration in the body axes. Also, the desired pitch attitude rate and vertical speed are converted to body axes.

$$\dot{q}_c = \frac{U_\theta}{\cos\phi} \quad \dot{w}_c = \frac{U_{V_z} + u\cos\theta\dot{\theta}_c}{\cos\theta\cos\phi} \qquad \text{Eqn.1}$$

$$q_c = \frac{\dot{\theta}_c}{\cos\phi} \quad w_c = \frac{V_{zc} + u\sin\theta}{\cos\theta\cos\phi}$$

At any given airspeed the linearized short-period longitudinal dynamics can be represented by:

$$\begin{bmatrix} \Delta\dot{w} \\ \dot{q} \end{bmatrix} = \begin{bmatrix} Z_w & Z_q + u_0 \\ M_w & M_q \end{bmatrix} \begin{bmatrix} \Delta w \\ q \end{bmatrix} + \qquad \text{Eqn.2}$$

$$\begin{bmatrix} Z_{\delta_{long}} & Z_{\delta_{coll}} & Z_{\delta_e} & Z_{\delta_{F_0}} \\ M_{\delta_{long}} & M_{\delta_{coll}} & M_{\delta_e} & M_{\delta_{F_0}} \end{bmatrix} \begin{bmatrix} \Delta\delta_{long} \\ \Delta\delta_{coll} \\ \Delta\delta_e \\ \Delta\delta_{F_0} \end{bmatrix}$$

This represents a linear state space model of the form:

$$\dot{x} = Ax + Bu \qquad \text{Eqn.3}$$

The B matrix in this case is wide due to the redundant controls effectors. Normally, model inversion is achieved by taking the inverse of B:

$$u = B^{-1}(\dot{x}_{des} - Ax_{des}) \qquad \text{Eqn.4}$$

However, in this case the matrix is square and cannot be inverted. In fact, since there are redundant controls, there are many different combinations of controls that will achieve the desired pitch and vertical body accelerations. One possible solutions is to use a left inverse of B, $$B^L = B^T(BB^T)^{-1} \qquad \text{Eqn.5}$$

which results in the control vector u with minimum norm. However, one might want to put different weighting on the magnitudes of each of the different control effectors. A weighted left inverse of the B matrix can be represented as:

$$B^+ = W(BW)^T[(BW)(BW)^T]^{-1} \qquad \text{Eqn.6}$$

the control law can then be represented by:

$$u = B^+(\dot{x}_{des} - Ax_{des}) \qquad \text{Eqn.7}$$

which gives the a control vector that achieves the desired accelerations while minimizing the norm of the vector Wu.

In general, the longitudinal dynamics of the aircraft will vary significantly with airspeed. An airspeed scheduled model of the longitudinal dynamics can be represented by:

$$\begin{bmatrix} \Delta\dot{w} \\ \dot{q} \end{bmatrix} = A_{lon}(V)\begin{bmatrix} \Delta w \\ q \end{bmatrix} + B_{lon}(V)\begin{bmatrix} \Delta\delta_{long} \\ \Delta\delta_{coll} \\ \Delta\delta_e \\ \Delta\delta_{F_0} \end{bmatrix} \qquad \text{Eqn.8}$$

The control law is given by:

$$\begin{bmatrix} \Delta\delta_{long} \\ \Delta\delta_{coll} \\ \Delta\delta_e \\ \Delta\delta_{F_0} \end{bmatrix} = B_{lon}^+(V)\left(\begin{bmatrix} \dot{w}_c \\ \dot{q}_c \end{bmatrix} - A_{lon}(V)\begin{bmatrix} w_c - w_{trim} \\ q_c \end{bmatrix}\right) \qquad \text{Eqn.9}$$

where $w_{trim} = V\tan\theta_{trim}$

The weighted left inverse is defined by:

$$B^+ = W_{lon}(B_{lon}W_{lon})^T(B_{lon}W_{lon}W_{lon}^T B_{lon}^T)^{-1} \qquad \text{Eqn.10}$$

$$W_{lon} = \begin{bmatrix} w_{long} & & & \\ & w_{coll} & & \\ & & w_e & \\ & & & w_{\delta_F} \end{bmatrix}$$

The parameters $w_{long}$, $w_{coll}$, $w_e$, and $w_{\delta_F}$ are selected to get the desired distribution of control to the longitudinal cyclic, collective, elevator, and flaperons respectively. For example, the $w_e$ term can be increased and the $w_{long}$ term increased to select more elevator relative to longitudinal cyclic when maneuvering the compound aircraft 2 in pitch. The distribution of the control among the redundant effectors may be scheduled, stored in computer memory 60 and selected by the microprocessor 38 to achieve user-selected overall operational objectives, such as limiting stress on a particular part or subsystem, minimizing vibration, reducing lifecycle costs, maximizing fuel economy, maximizing speed, or any other operational objective.

The required changes to the control settings 78 from the airspeed-scheduled inversion module 92 are directed to the three mixers 82-86, as described above relating to FIG. 6.

G. Speed Command/Speed Hold

Figure 8:
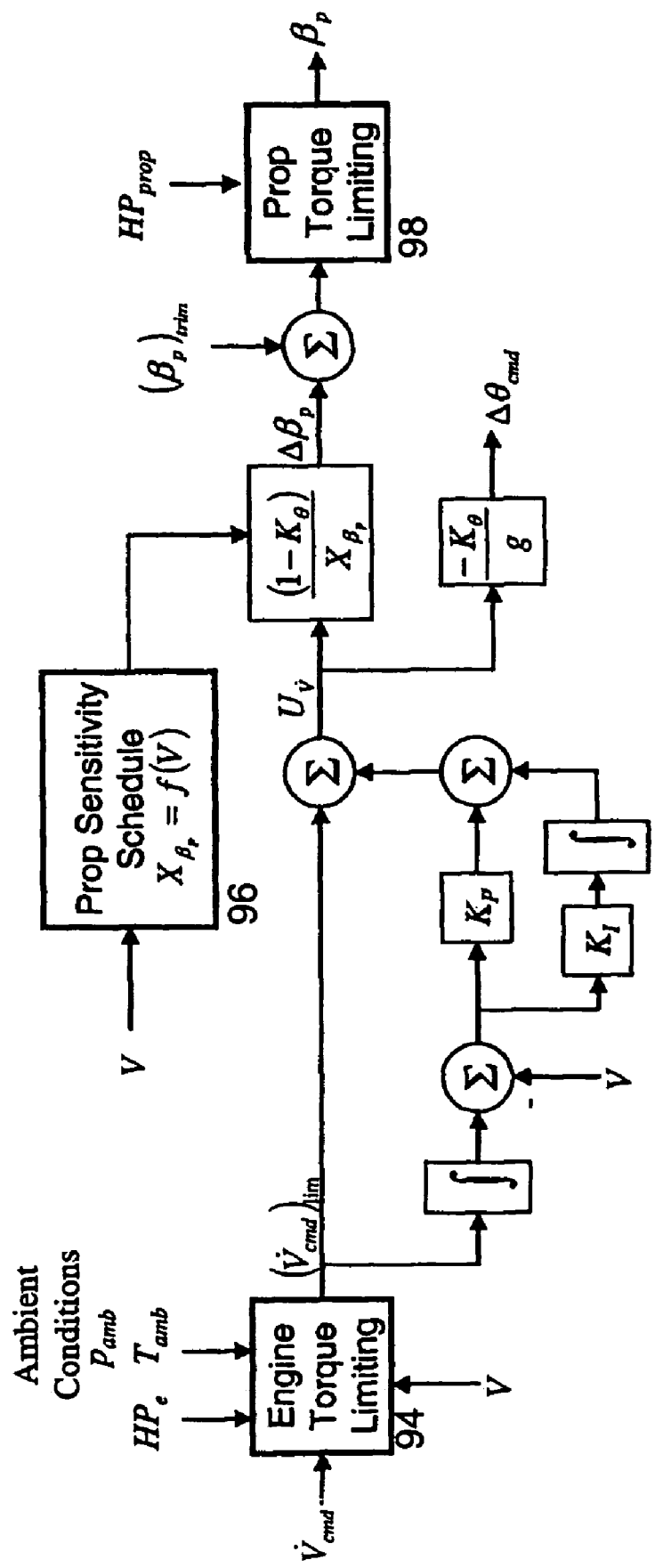
FIG. 8 illustrates the speed command/speed hold subsystem.

FIG. 8 illustrates the operation of the speed command/speed hold subsystem 70. The speed command/speed hold system 70 allows the control system 62 to respond to longitudinal acceleration commands ($\dot{V}_{CMD}$) and holds the existing forward speed ($V_z$) of the aircraft when no change in command is received. The overall purpose of the speed command/speed hold system 70 is to simplify the pilot task of controlling forward speed. In a helicopter, the forward acceleration and deceleration, and hence forward speed, is controlled by the pitch attitude ($\theta$) of the main rotor disk. In the compound aircraft 2, the forward speed of the aircraft 2 is controlled not only by pitch attitude of the main rotor disk but also by the propeller blade pitch ($\beta_p$). The speed command/speed hold 70 control subsystem integrates the propeller blade pitch control with the pitch attitude of the aircraft 2 so that the pilot can control forward speed with a single inceptor.

Figure 9:
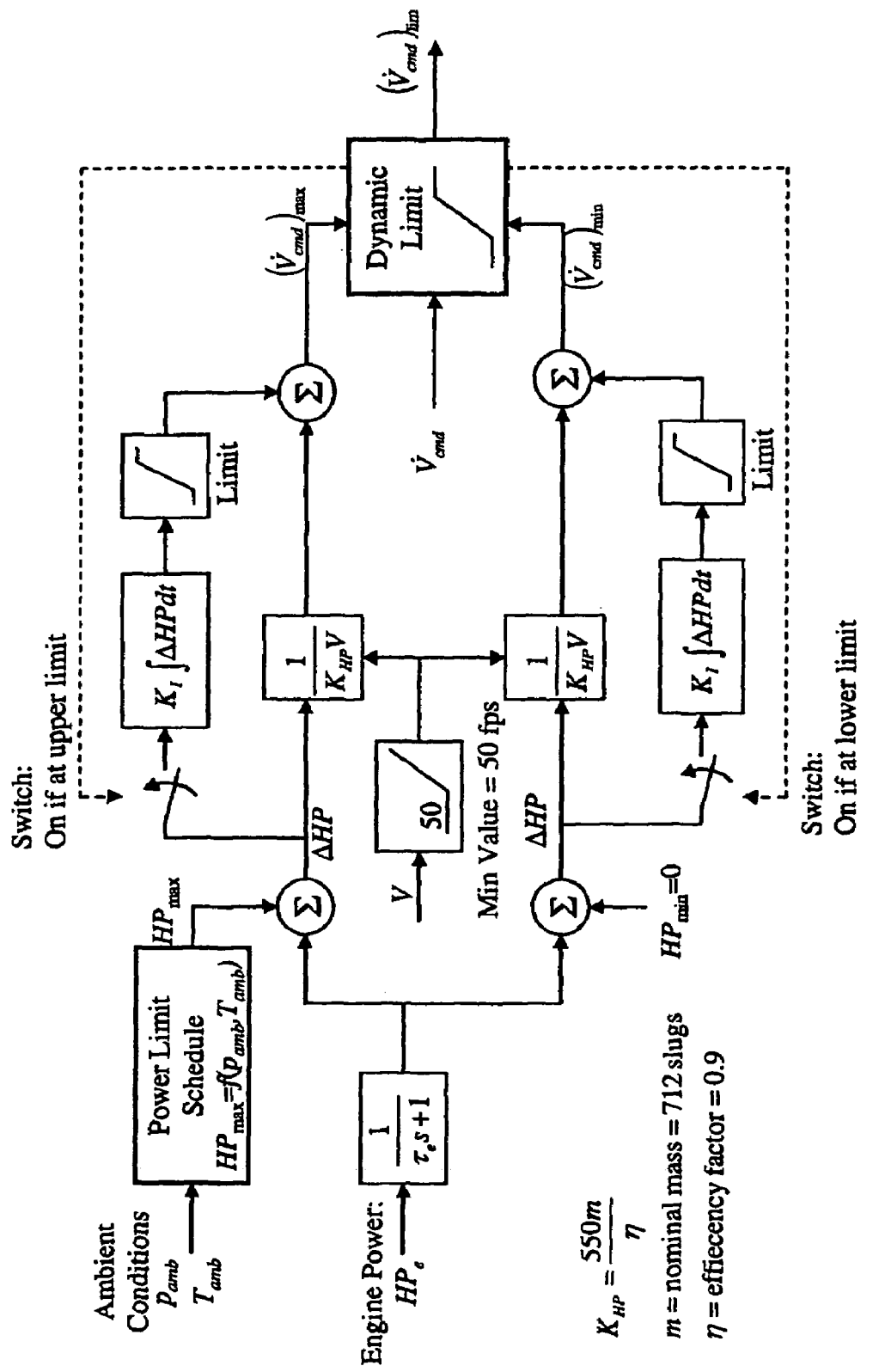
FIG. 9 illustrates the engine torque limiting module

The engine torque limiting module 94, illustrated by FIG. 8 and shown in detail in FIG. 9, constrains the pilot command 64 for forward acceleration or deceleration by imposing engine torque (power) limits. Engine torque limits prevent the control system 62 from calling for control settings 78 that require more than 100% or less than 0% of the available output of the engine. The aircraft condition information 66 required by the torque limiting module include the pilot command 64 for forward acceleration ($\dot{V}_{CMD}$), airspeed, engine torque, propeller blade torque and ambient conditions. The output of the torque limiting module is a constrained acceleration ($\dot{V}_{CMD}$)$_{LIM}$.

The constrained acceleration command is integrated to create a command forward speed. This is compared to the measured forward speed to calculate an error signal which is passed through a PI compensator and the resulting signal is added to the commanded acceleration to create a pseudo-control for forward speed. The PI compensator provides the Speed Hold function of the controller.

The forward speed pseudo-control represents the desired forward acceleration. A simplified linear model of the speed dynamics can be represented as:

$$\dot{V} = X_{\beta_p} \Delta \beta_p - g \Delta \theta \qquad \text{Eqn.11}$$

Acceleration is proportional both to main rotor disk pitch attitude and the change in propeller pitch. The equation can be inverted to calculate the change in pitch attitude and propeller pitch needed to achieve the desired forward acceleration:

$$\Delta \theta_{cmd} = -\frac{K_\theta}{g} U_{\dot{V}} \qquad \text{Eqn.12}$$

$$\Delta \beta_p = \frac{(1 - K_\theta)}{X_{\beta_p}} U_{\dot{V}}$$

The $X_{\beta_p}$ term represents the sensitivity of auxiliary thrust due to propeller pitch changes. It is a function of flight condition, and in this case is scheduled with airspeed. It could be scheduled with other parameters if necessary, but an exact value of the propeller sensitivity is not needed.

The change in propeller pitch is added to the trim propeller pitch specified by the optimal trim schedule. Likewise the $\Delta \theta_{cmd}$ term is added to the optimal trim pitch attitude in the Longitudinal AFCS. The propeller pitch setting can be limited to observe torque limits on the propeller gearbox using a similar scheme used for engine torque limiting.

The gain $K_\theta$ represents the amount of pitch attitude used for acceleration relative to auxiliary thrust. So if $K_\theta = 1$ the aircraft accelerates like a helicopter using changes in pitch attitude and the propeller pitch only changes to follow the optimal trim schedule. If $K_\theta = 0$, the aircraft accelerates using auxiliary thrust while the pitch attitude follows the optimal trim schedule. The designer can select $K_\theta$ to achieve optimal distribution of control in maneuvering flight. The gain may be scheduled with current aircraft condition and selected overall operational objective.

The propeller sensitivity schedule 96 of FIG. 8 represents the relationship between propeller pitch and the amount of thrust generated by the propeller 26. This relationship is referred to by the term $X_{\beta_p}$ and is a function of airspeed.

The speed command/speed hold subsystem 70 determines the changes to the propeller pitch ($\beta_p$) and to the pitch attitude ($\theta$) of the aircraft necessary to achieve the allocated commanded forward acceleration or deceleration. If a compound aircraft 2 is accelerating from the minimum power speed or is descending, it can accelerate very quickly because excess power is available. If the compound aircraft 2 is climbing, operating near the maximum speed or performing an aggressive turn, then available excess power and hence acceleration is limited. The maximum acceleration may even be negative because the pilot needs to bleed off airspeed to perform a maneuver. This subsystem calculates constraints on the acceleration based on the current power and available power of the aircraft.

The engine power (or torque) is measured and filtered. The maximum power available from the engines is typically a function of ambient conditions. Helicopter turbine engines have less power available at high altitude or high ambient temperatures. In some cases the power may be limited by transmission limits. A schedule is used to determine maximum power. Maximum power is compared to the measured power to determine the power margin. For the deceleration limit, the power is compared to the minimum power, which would be set to 0 or some small value to prevent over speed of the rotor and drive system.

A simple relationship is used to estimate acceleration limits from the power margin. The kinetic energy of the aircraft is represented by:

$$K.E. = \frac{1}{2} mV^2 \qquad \text{Eqn.13}$$

The power increment required to accelerate can be estimated by taking the derivative of the kinetic energy equation and also including an efficiency factor, $\eta$.

$$\Delta P = \frac{mV\dot{V}}{\eta} \qquad \text{Eqn.14}$$

Substituting the power margin for $\Delta P$ and allowing for conversion from horsepower:

$$\dot{V}_{lim} = 550 \frac{\eta \Delta HP}{mV} \qquad \text{Eqn.15}$$

When implementing equation 15, it is necessary to put a lower limit on the speed term to avoid division by zero.

The relationship expressed in equation 15 provides an approximate expression for the acceleration limits. If the aircraft is accelerating at a limit defined by Equation 15, the power margin may not approach zero in steady-state. This may allow the aircraft to exceed the power limit in steady-state or operate too conservatively below the power limit. If the aircraft is operating at an acceleration limit, a correction mechanism is engaged. The power margin is passed though an integrator compensator and added to the acceleration limit. This step forces the power margin to approach zero if the aircraft is operating at an acceleration limit.

H. Lateral/Directional Control

Figure 10:
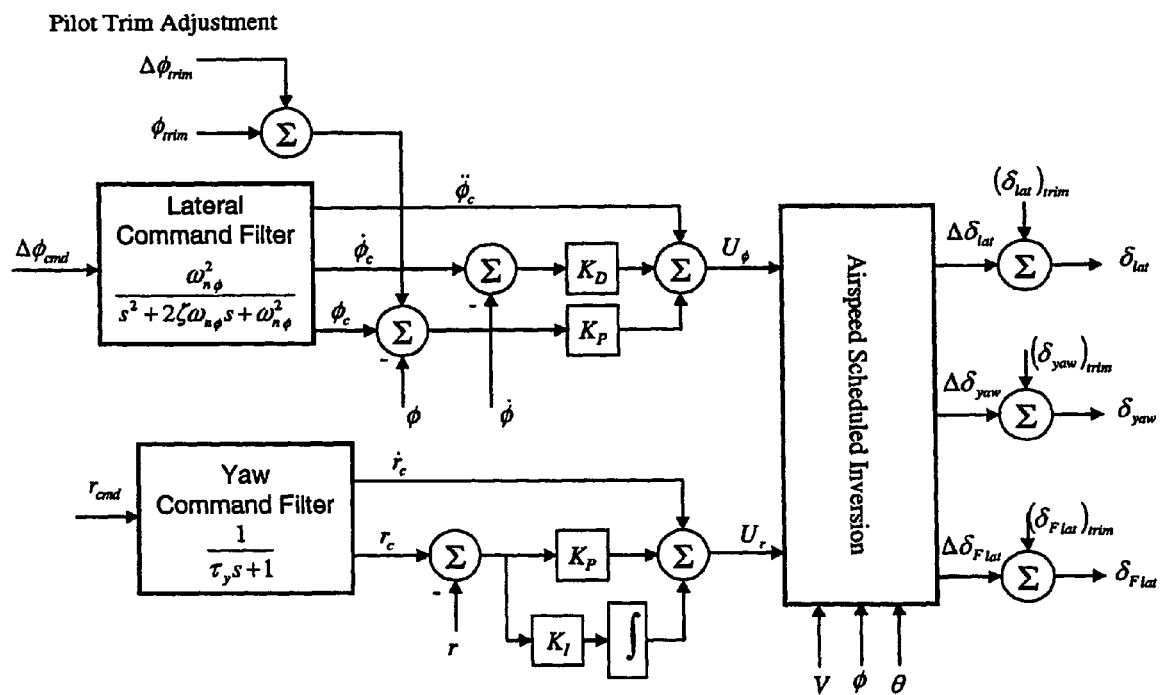
FIG. 10 illustrates the lateral/directional control subsystem.

FIG. 10 is a schematic diagram of the coupled lateral/directional control subsystem 74. The operation of the lateral/directional control subsystem 74 is directly analogous to the operation of the longitudinal/vertical control subsystem 72 illustrates by FIG. 7 and discussed above. The purpose of the lateral/directional control subsystem 74 is to integrate the redundant controls of the compound aircraft 2 for roll and yaw. Those redundant controls include the lateral cyclic, differential flaperons, sector, rudder and propeller pitch.

The inputs to this subsystem are the commanded roll attitude, the commanded yaw rate, and the trim roll attitude. The outputs of the system are the lateral cyclic, differential flaperons, and yaw control. The lateral/directional control system 74 uses a model following/model inversion architecture. The model and the control subsystem 74 are configured to achieve attitude command/attitude hold in roll so that the aircraft will respond to a command to achieve a desired roll and roll rate and will hold a selected roll angle. The model and the control subsystem 74 also are configured to achieve rate command heading/heading hold in yaw, so that the aircraft will achieve a commanded yaw rate and will hold a specified yaw angle in flight. The model and control system can be configured to exhibit any desired dynamic response, such as the requirements of the ADS-33 specification set. The desired roll response is second order and can be designed to meet the ADS-33 roll bandwidth requirements. The desired yaw response is first order can be designed to meet the ADS-33 yaw bandwidth requirements.

The pilot commands 6 to the lateral/directional subsystem 74 include the pilot-commanded roll rate ($\Delta\Phi_{CMD}$) and the pilot-commanded yaw rate ($\tau_{CMD}$). The subsystem 74 also receives the trim roll attitude from the optimum trim schedule 68. The aircraft condition information 66 inputs include the roll attitude and roll rate, yaw attitude, airspeed, and pitch attitude. The outputs of the system are supplied to the rotor mixing module 84, the wing mixing module 82 and the VTDP mixing module 86, as illustrated by FIG. 6. As in Equations 8 to 10, a weighted pseudo-inverse is used to distribute control among the three lateral-directional controls.

I. Turn Coordination/Yaw Rate Command

Figure 11:
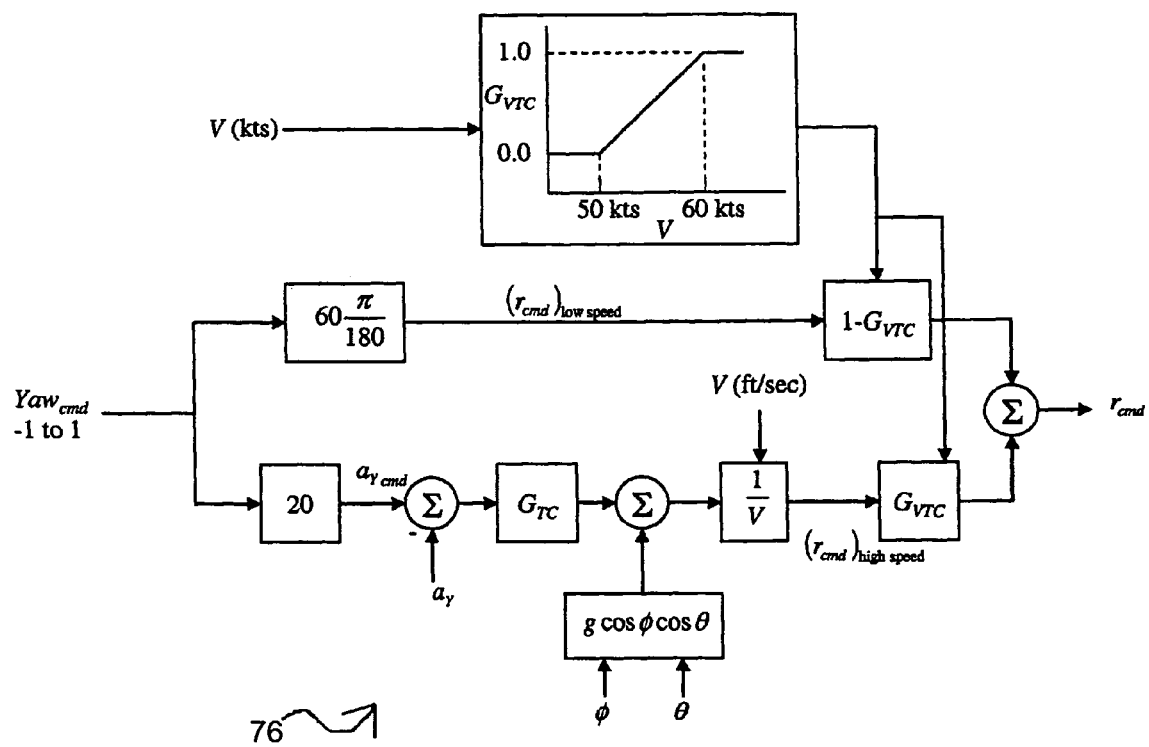
FIG. 11 illustrates the turn coordination/yaw rate command module.

FIG. 11 illustrates in detail the turn coordination/yaw rate command subsystem 76 shown on FIG. 6. The turn coordination/yaw rate command subsystem 76 is desirable because the turning characteristics and requirements of the compound aircraft 2 flying at low speed are different from the turning characteristics and requirements when the aircraft 2 is flying at high speed. The Yaw Rate Command mode is desirable for speeds below 50 knots and the Turn Coordination mode is desirable for speeds above 60 knots. A simple blending scheme is used for transitions between 50 and 60 knots. At low speed (below 50 knots) the turn coordination/yaw rate control system 76 will allow the aircraft 2 to turn at a yaw rate (r) of up to 60 degrees/second. At high speed (greater than 60 knots) the control system allows a maximum lateral acceleration of 20 ft/sec². For speeds between 50 and 60 knots, the yaw rate and lateral acceleration commands are blended. The output of the turn coordination/yaw rate command subsystem 76 ($r_{CMD}$) is fed directly to the lateral/directional control subsystem 74, as shown by FIG. 6.

The turn coordination mode calculates an effective yaw rate for turn coordination. This yaw rate can be fed directly to the Lateral/Directional AFCS, so no changes to this AFCS need to be made as the aircraft transitions from low speed to high speed mode. The commanded lateral acceleration is compared to measured value. The turn coordination controller can be derived from the equation of motion for the lateral body velocity:

$$\dot{v}=a_y-ur+pw+g \sin \phi \cos \theta \qquad \text{Eqn.16}$$

With some simplifying assumptions one can derive the control law:

$$r_{cmd} = \frac{G_{TC}(a_{y_{cmd}} - a_y) + g\sin\phi\cos\theta}{V} \qquad \text{Eqn.17}$$

The yaw rate command is calculated to correct the lateral acceleration error and then fed to the Lateral-Directional AFCS.

J. Return to Trimmed Flight after a Maneuver

At the end of a maneuver, the compound aircraft 2 returns automatically to trimmed flight optimized to achieve the selected overall operational objective. The microprocessor 38 constantly updates the combination of trim settings selected from the trim schedule based on feedback in the form of the measured condition of the compound aircraft 2 as detected by sensors 40. The selected combination of trim settings changes relatively slowly because the parameters on which the selection is based (parameters such as airspeed, altitude and vehicle gross weight) change relatively slowly.

During a maneuver of the compound aircraft 2, the dynamic inversion controller is constantly receiving feedback and is adding or subtracting control effector deflections to achieve the commanded maneuver. The corrections of the dynamic inversion controller are based mainly on the feedback of aircraft condition variables that change rapidly with time, for example angular rate and aircraft attitude.

When the compound aircraft 2 reaches equilibrium after a maneuver, the aircraft conditions as detected by the sensors 40 (and especially the fast parameters such as aircraft attitude) will have reached near steady-state and the feedback signals will approach zero or a small value. In addition, once the aircraft 2 is in trimmed flight, the pilot will have moved the control inceptors back to the detent position, indicating that the pilot is commanding trimmed flight. The control system 62 will adjust the control effectors consistent with the constantly-updated combination of trim settings to achieve the selected overall operational objective.

K. Simulation Study

The benefits of a compound aircraft 2, including a compound aircraft 2 having the control system 62 of the Invention, have been demonstrated. A simulation study was performed that compared the performance of an AH-60 Blackhawk helicopter to a similar Blackhawk helicopter equipped as a compound aircraft 2. The simulation study evaluated conditions of minimum power usage and minimum vibration, among others, in trimmed flight for comparable aircraft with comparable loads and for comparable altitudes and air temperatures.

The simulation study showed that the compound aircraft 2 was capable of higher speeds than the comparable helicopter and that the compound aircraft 2 was capable of operating with less power than the helicopter for any particular airspeed. When optimized for minimum vibration, the simulated compound aircraft 2 offered significant vibration reduction compared to the helicopter. The simulation study showed that reduced vibration did not necessarily coincide with reduced power.

The simulation study demonstrates that no one set of control settings is optimal for all possible missions of the compound aircraft 2 and that control settings 78 may be optimized to accomplish an overall objective, such as minimizing vibration or minimizing power. The study also demonstrated that the optimum control settings 78 to accomplish an objective vary with the flight condition of the aircraft 2, such as airspeed.

L. Control of Maneuvering Flight

The control system 62 of the Invention may be used to achieve a user-selected overall operational objective for maneuvering flight as well as trimmed flight. For maneuvering flight, the objective of achieving a selectable overall operational objective may be accomplished by selecting appropriate weighting factors for distribution of control among the various control effectors.

An investigation conducted concerning the Invention demonstrated that selection of weighting factors can limit structural loads during critical maneuvers. For example, the weighting factor "$K_\theta$" is applied in the Speed Command/Speed Holding subsystem to allocate forward thrust between the main rotor and the propeller. Different values of the $K_\theta$ parameter may be scheduled and stored in computer memory 60. The appropriate value for $K_\theta$ may be selected by the microprocessor 38 to achieve a selectable overall operational objective based on the current condition of the aircraft and on the control inceptor input.

Other weighting factors applicable to the other control effectors appear in the model inversions of FIGS. 6-11 and are indicated collectively in the figures and the equations by the symbol "w." In the discussion above for longitudinal control and vertical control, the weighting factors are indicated as "$w_{long}$, $w_{coll}$, $w_e$, and $w_{\delta_F}$" for weighting factors for longitudinal cyclic, collective, elevator and flaperons, respectively. Similar weighting factors exist for the Lateral/Directional system; namely, $w_{lat}$, $w_{dir}$, $w_{df}$ relating to lateral cyclic, directional control and differential flaperons, respectively. Other weighting factors also may be applied.

The weighting factors may be selected by the microprocessor 38 from a weighting factor schedule stored in computer memory 60, just as a combination of control settings for trim is selected from the trim schedule. The weighting factor schedule may be configured to select particular weights based on an overall objective to be achieved (i.e., vibration reduction, life cycle cost reduction, prevention of over stressing a component) and upon current flight conditions such as airspeed, altitude, vehicle gross weight and center of gravity position. Other parameters may be used to select the appropriate weighing factor from the schedule.

M. Other Applications

The control system 62 of the Invention may be applied in any situation where an objective can be accomplished through any one of a plurality of combinations of control variables and where the different combinations of control variables achieve different overall objectives. In the control system 62 of the Invention, the user selects among the overall objectives. The control system 62 then selects the appropriate combination of control variables to accomplish the objective consonant with the selected overall objective.

A user may select an overall operational objective by any conventional means, such as by selecting an icon on a computer display, by throwing a switch, or by affixing a jumper to a circuit board.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

What is claimed is:

1. A compound aircraft, said compound aircraft comprising:
   a. a fuselage;
   b. a main rotor rotatably connected to said fuselage, said main rotor being configured to exert a main rotor lifting force to said fuselage;
   c. a wing connected to said fuselage, said wing being configured to exert a wing lifting force to said fuselage, said main rotor and said wing in combination being configured to exert a total lifting force to said fuselage;
   d. means to select an operational objective by a user of the compound aircraft from among a plurality of operational objectives;
   e. an inceptor, said inceptor being configured to receive a command for a trimmed flight;
   f. a microprocessor, said microprocessor being operably connected to said main rotor and to said wing, said microprocessor being operably connected to said means to select said operational objective and to said inceptor, said microprocessor being configured to receive said selected operational objective from said means to select said operational objective, said microprocessor being configured to receive said command for said trimmed flight from said inceptor;
   g. a computer memory operably connected to said microprocessor, said computer memory storing a database accessible to said microprocessor, said database including a plurality of combinations of trim settings, each of said plurality of combinations of trim settings being configured to achieve said command for said trimmed flight when applied by said microprocessor, a one of said plurality of combinations of trim settings corresponding to said selected operational objective, said microprocessor being configured to select said one of said plurality of combinations of trim settings corresponding to said selected operational objective, said microprocessor being programmed to allocate said total lifting force between said rotor lifting force and said wing lifting force for said trimmed flight, said microprocessor being programmed to base said allocation of said total lifting force for said trimmed flight upon said selected one of said plurality of combinations of trim settings.

2. The compound aircraft of claim 1, the compound aircraft further comprising: a sensor, said sensor being operably connected to said microprocessor, said sensor being configured to detect an aircraft condition, said sensor being configured to communicate said aircraft condition to said microprocessor, said microprocessor being programmed to base said allocation of said total lifting force between said main rotor lifting force and said wing lifting force based upon said aircraft condition.

3. The compound aircraft of claim 2 wherein said command for said trimmed flight is a one of a plurality of possible commands for said trimmed flight and wherein said plurality of combinations of trim settings is a one of a plurality of pluralities of combinations of trim settings, each of said plurality of pluralities of combinations of trim settings corresponding to a one of said plurality of operational objectives.

4. The compound aircraft of claim 1 wherein
   a. said main rotor is configured to selectably apply a rotor rolling moment to said fuselage, said rotor rolling moment being variable;
   b. said wing is configured to selectably apply a wing rolling moment to said fuselage, said wing rolling moment being variable, said main rotor and said wing in combination exerting a total rolling moment on said fuselage;
   c. said microprocessor is programmed to allocate said total rotting moment between said main rotor rolling moment and said wing rolling moment for said trimmed flight, said microprocessor being programmed to base said allocation of said total rolling moment for said trimmed flight upon said selected one of said plurality of combinations of trim settings.

5. The compound aircraft of claim 4 wherein said main rotor is configured to provide a main rotor forward thrust, said main rotor forward thrust being variable, the compound aircraft further comprising:
  a. means for providing a non-rotor forward thrust, said non-rotor thrust being variable, said non-rotor forward thrust and said main rotor forward thrust in combination defining a total forward thrust;
  b. said microprocessor being operably connected to said means to provide said non-rotor forward thrust, said microprocessor being programmed to allocate said total forward thrust between said main rotor forward thrust and said non-rotor forward thrust for said trimmed flight, said microprocessor being programmed to base said allocation of said total thrust for said trimmed flight upon said selected one of said plurality of combinations of trim settings.

6. The compound aircraft of claim 5 wherein said main rotor has a collective setting and a cyclic setting, said selected combination of said trim control settings including said collective setting and said cyclic setting and wherein said configuration of said wing to provide said wing lifting force comprises: a flap operably connected to said wing, said flap having a variable angle with respect to said wing, said microprocessor being programmed to select said angle of said flap, said angle of said flap being defined by said selected combination of trim control settings.

7. The compound aircraft of claim 5 wherein said means to provide non-rotor forward thrust comprises: a propeller having a variable propeller pitch, said propeller being rotatably attached to said fuselages, said microprocessor being operably connected to said propeller, said microprocessor being programmed to select said propeller pitch, said propeller pitch being defined by said selected combination of trim control settings.

8. The compound aircraft of claim 7, the compound aircraft further comprising:
  a. a rudder connected to said fuselage, said rudder being configured to impart a variable rudder yaw moment to said fuselage, said configuration of said rudder to impart said variable yaw moment comprising said rudder having a variable rudder angle with respect to said fuselage, said propeller being adapted for rotation and adapted to generate a stream of air when said propeller is rotating, said rudder being located within said stream of air generated by said propeller when said propeller is rotating;
  b. a sector operably connected to said fuselage, said sector being configured to impart a variable sector yaw moment to said fuselage, said configuration of said sector to impart said sector yaw moment comprising said sector being configured to variably receive said stream of said air when said propeller is rotating, said sector being adapted to variably redirect said stream of said air, said variable rudder yaw moment and said variable sector yaw moment in combination defining a total yaw moment;
  c. said sector and said rudder being operably connected to said microprocessor, said microprocessor being programmed to allocate said total yaw moment between said rudder yaw moment and said sector yaw moment for said trimmed flight, said microprocessor being programmed to base said allocation of said total yaw moment for said trimmed flight upon said selected one of said plurality of combinations of trim settings.

9. The compound aircraft of claim 4 wherein said adaptation of said wing to provide said wing rolling moment comprising: a pair of ailerons operably connected to said wing, said pair of ailerons being adapted to have differential positions, said microprocessor being configured to select said differential positions of said pair of ailerons, said differential positions of said pair of ailerons being defined by said selected combination of trim control settings.

10. The compound aircraft of claim 9 wherein said pair of ailerons is a pair of flaperons.

11. A compound aircraft, said compound aircraft comprising:
  a. a fuselage;
  b. a main rotor rotatably connected to said fuselage, said main rotor being configured to exert a main rotor lifting force to said fuselage;
  c. a wing connected to said fuselage, said wing being configured to exert a wing lifting force to said fuselage, said main rotor and said wing in combination being configured to exert a total lifting force to said fuselage;
  d. means to select an operational objective by a user of the compound aircraft from among a plurality of operational objectives;
  e. an inceptor, said inceptor being configured to receive a command for a maneuvering flight;
  f. a microprocessor, said microprocessor being operably connected to said main rotor and to said wing, said microprocessor being operably connected to said means to select said operational objective and to said inceptor, said microprocessor being configured to receive said selected operational objective from said means to select said operational objective, said microprocessor being configured to receive said command for said maneuvering flight from said inceptor;
  g. a computer memory operably connected to said microprocessor, said computer memory storing a database accessible to said microprocessor, said database including a plurality of combinations of weighting factors, each of said plurality of combinations of weighting factors being configured to achieve said command for said maneuvering flight when applied by said microprocessor, a one of said plurality of combinations of weighting factors corresponding to said selected operational objective, said microprocessor being configured to select said one of said plurality of combinations of weighting factors corresponding to said selected operational objective, said microprocessor being programmed to allocate said total lifting force between said rotor lifting force and said wing lifting force for said maneuvering flight, said microprocessor being programmed to base said allocation of said total lifting force for said maneuvering flight upon said selected one of said plurality of combinations of weighting factors.

12. The compound aircraft of claim 11 wherein said command for maneuvering flight is a one of a plurality of possible commands for maneuvering flight and wherein said plurality of combinations of weighting factors is a one of a plurality of pluralities of combinations of weighting factors.

* * * * *